June 14, 1932. H. C. SNOW 1,862,714

BATTERY MOUNTING FOR AUTOMOBILES

Filed July 17, 1930  2 Sheets-Sheet 1

Inventor
HERBERT C. SNOW
By: Arthur Wm Nelson
Atty.

June 14, 1932. H. C. SNOW 1,862,714
BATTERY MOUNTING FOR AUTOMOBILES
Filed July 17, 1930 2 Sheets-Sheet 2

Inventor
HERBERT C. SNOW
By: Arthur W. Nelson
Atty.

Patented June 14, 1932

1,862,714

UNITED STATES PATENT OFFICE

HERBERT C. SNOW, OF AUBURN, INDIANA, ASSIGNOR TO MANNING & CO., OF CHICAGO, ILLINOIS, A CORPORATION OF ILLINOIS

BATTERY MOUNTING FOR AUTOMOBILES

Application filed July 17, 1930. Serial No. 468,528.

This invention relates to improvements in battery mountings for automobiles and it consists of the matters hereinafter described and more particularly pointed out in the appended claims.

The primary object of the invention is to provide a mounting of this kind which securely holds the associated battery against undesired movement but permits of its quick removal when necessary.

Another object of the invention is to provide a battery mounting which though located beneath one of the front fenders of the automobile, requires no disfigurement thereof and the parts are so correlated as to protect the battery against wheel splashings and fender drippings and at the same time permits a ready inspection of the battery.

These objects of the invention as well as others together with the many advantages thereof will more fully appear as I proceed with my specification.

In the drawings:—

Figure 1:
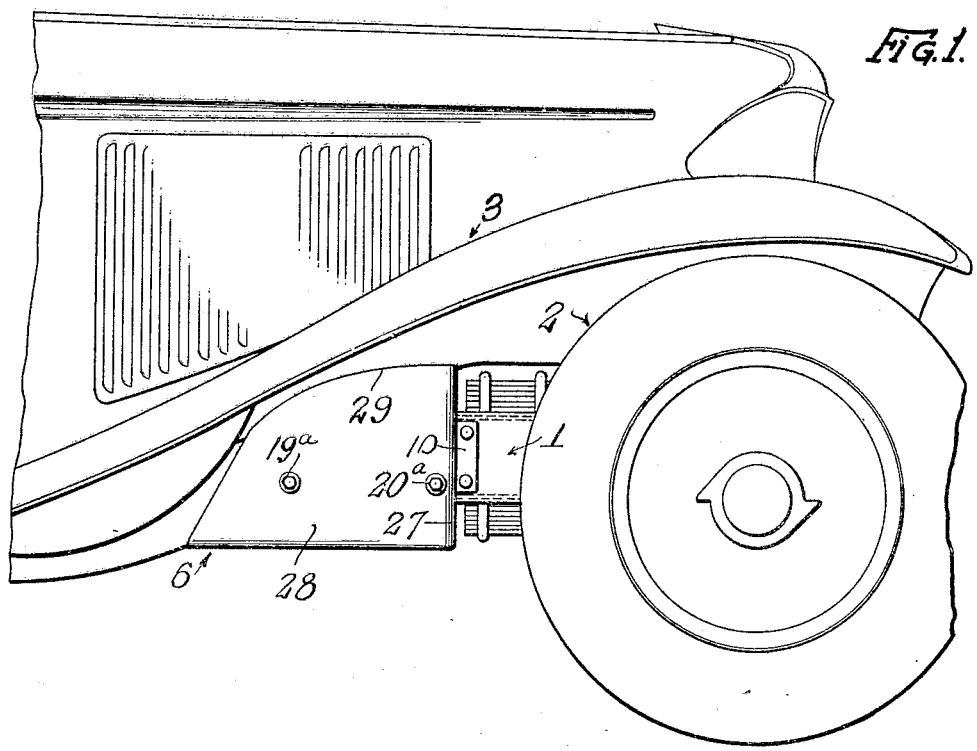
Fig. 1 is a view in side elevation of the front end portion of an automobile showing my improved means for mounting a battery up under one of the front fenders thereof.

Referring now in detail to that embodiment of the invention illustrated in the drawings, 1 indicates the front end of the right hand frame member of an automobile chassis, 2 indicates the associated front wheel and 3 indicates the fender secured to said frame member in any suitable manner and overhanging said wheel.

4 indicates as a whole a mounting for the battery 5, and 6 indicates the cover associated with the mounting to coact therewith in enclosing the battery.

The mounting includes a pair of longitudinally spaced brackets 7 and 8 respectively which project laterally from the frame member 1. Each bracket which is preferably made of a sheet metal stamping comprises a plate like body 9 having an outwardly bent flange 10 along its upright margin and an inturned flange 11 along its bottom horizontal margin. The brackets are spaced apart a distance greater than the length of the battery 5 and the flange 10 of each bracket is engaged with and secured to the outer surface of the chassis frame member at a point between the front wheel and that portion of the fender in the plane of said frame member. Spot welded to the inturned flange 11 of both brackets is a rectangular metallic plate providing a shelf or floor 12 upon which the battery 5 engages. The brackets 7 and 8 are each cut away from its inner top corner to its bottom outer corner so that it decreases in depth from its bottom toward is top.

Associated with the brackets 7 and 8 is a U-shaped strap 13 including side legs 14 and 15 respectively and a cross bar 16. The strap is positioned a suitable distance above the shelf or floor 12 and the side leg 14 is welded to the inner surface of the plate 9 of the bracket 7 while the side leg 15 is welded to the inner surface of the plate 9 of the bracket 8, with the cross bar 16 spaced a short distance laterally from the frame member 1. Each leg has an outturned free end, providing ears 17 and 18 respectively and in each ear is fixed a bolt 19 and 20 respectively.

Associated with one of the strap legs and preferably the leg 15 is a spacer 21. This spacer is made from strap metal of a width greater than that of the strap 13 and is substantially U-shaped and comprises long and short side bars 22—23 respectively and a bowed connecting bar 24. The longer side bar 22 is provided with an end opening to engage the bolt 20 while the shorter side bar is provided with a notch 25 to engage upon a part of the leg 15 of the strap 13 at a point spaced inwardly from the ear 18.

Figure 2:
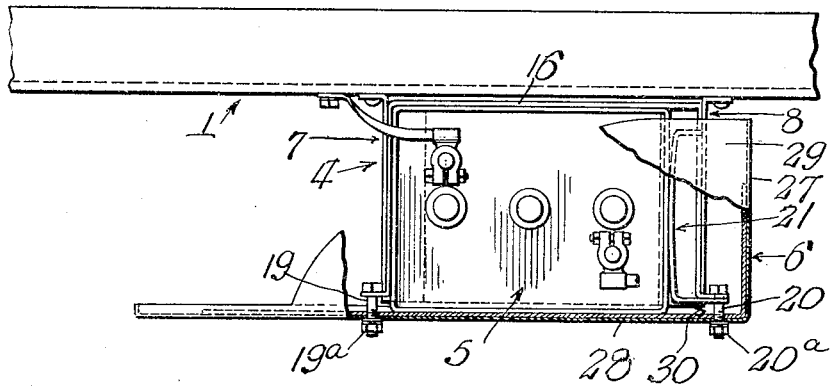
Fig. 2 is a top plan view of the mounting shown in Fig. 1 with a part of the cover illustrated as broken away to more clearly show the relation of the several parts thereof.
Figure 3:
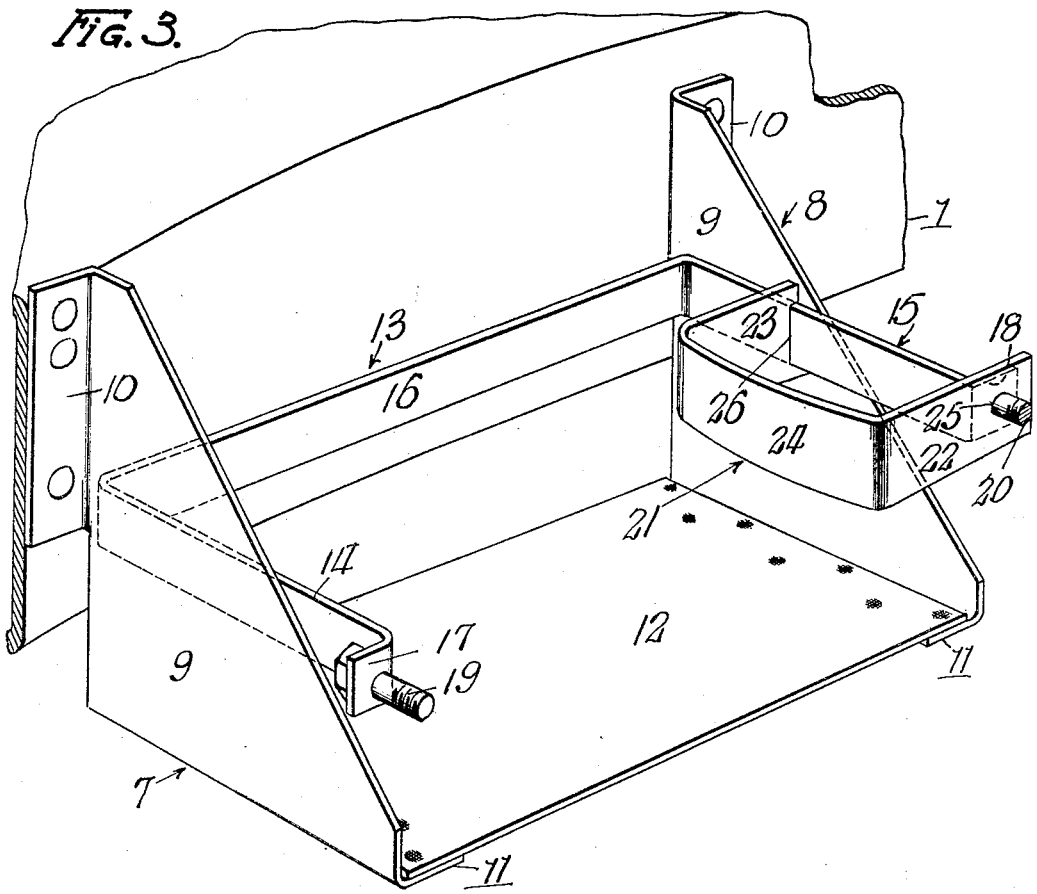
Fig. 3 is a detail perspective view of that part of the mounting carried upon one of the chassis members.
Figure 4:
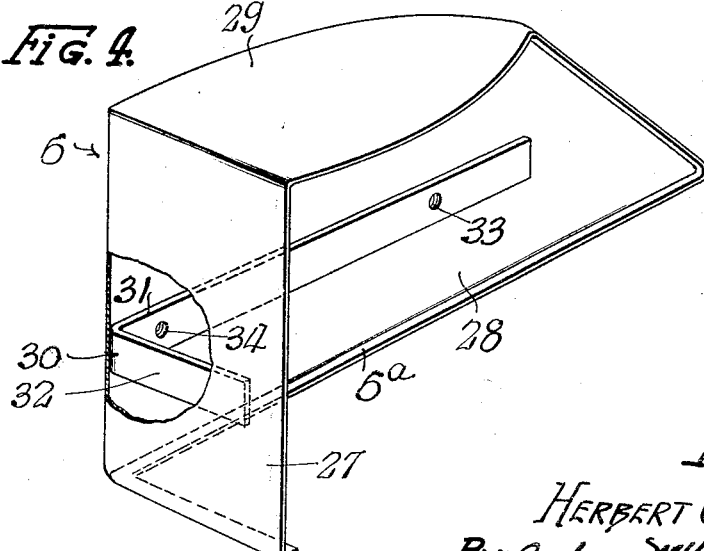
Fig. 4 is a perspective view on a smaller scale of the cover associated with the parts of the mounting shown in Fig. 3.

When the battery 5 is in the mounting thus far described, its bottom engages upon the shelf 12, one end engages the strap leg 14 and the other end engages with the cross bar 24 of the spacer 21 while the rear side of the battery engages against the cross bar 16 of the strap 13 and the front side of the battery projects a short distance beyond the plane of the ears 17 and 18 all as best shown in Fig. 2. In this respect, it is pointed out, that in positioning the battery upon the mounting, the same is slid thereinto laterally and when the spacer is engaged by one end of the battery, said spacer will yield slightly so that when the battery is finally positioned said spacer exerts an action thereon which holds the same against movement.

Associated with the mounting thus far described is the cover 6 which is made of sheet metal and includes upright end and front walls 27 and 28 respectively and a horizontal top wall 29, a flange 6ª being provided along the bottom edges of the end and front walls and which flange extends along one end of the front wall to stiffen the same. To further rigidify the cover. I secure to the inner surface of the side and front wall an L-shaped strap 30 having a relatively long leg 31 associated with the front wall and a shorter leg 32 associated with the end wall. In said long leg of the strap and in those portions of the front wall of the cover engaged therewith are openings 33 and 34 respectively spaced apart a distance corresponding to that between the bolts 19 and 20.

After the battery is in place in the mounting as before described, the cover is applied from the front side of the mounting so that the holes 33—34 in the cover line up with the bolts 19 and 20 to receive the same after which nuts 19ª and 20ª respectively are applied to the free ends of said bolts. When the cover is in place, its strap leg 31 engages the front side of the battery to coact with the spacer to securely hold the battery in the mounting.

Should it be desired to inspect or test the battery, this may be readily carried out merely by taking off the nuts 19ª and 20ª and then removing the cover laterally from the mounting.

The structure described, though light in weight is strong and rigid and holds the battery against undesired movement and at the same time protects the battery against wheel splashing and drippings from the fender.

While in describing the invention, I have referred in detail to the form, arrangement and construction of the parts thereof, the same is to be considered merely as illustrative so that I do not wish to be limited thereto except as may be specifically set forth in the appended claims.

I claim as my invention:—

1. In combination with an automobile including a side frame member and an associated fender, means secured to and projecting from the outside of said side frame member beneath the fender and providing a support for a battery which support is open along that side spaced from the frame member for the lateral removal and insertion of the battery from below the fender and removable means for closing the open side of said support for retaining the battery therein.

2. In combination with an automobile including a side frame member and an associated fender, means secured to and projecting from the outside of said side frame member beneath the fender and providing a support for a battery which support is open along that side spaced from the frame member for the lateral removal and insertion of the battery from below the fender and a removable cover for closing the open side as well as one end and the top of said support for retaining the battery therein.

3. In combination with an automobile including a side frame member and an associated fender, means on said side frame member providing a laterally extending support beneath the fender for a battery which support is open along that side spaced from the frame member for the lateral removal and insertion of the battery from below the fender, means carried by one end of said support providing means and engaging and spacing the associated end of the battery therefrom and removable means for closing the open side of said support for retaining the battery therein.

4. In combination with an automobile including a side frame member and an associated fender, means on said side frame member providing a laterally extending support beneath the fender for a battery which support is open along that side spaced from the frame member for the lateral removal and insertion of the battery from below the fender, means carried by one end of said support providing means and engaging and spacing the associated end of the battery therefrom and a removable cover for closing the open side as well as one end and the top of said support for retaining the battery therein.

5. In combination with an automobile including a side frame member and an associated fender, means on said side frame member providing a support for a battery which support is open along that side spaced from the frame member for the lateral removal and insertion of the battery, yieldable means carried by one end of said support providing means and engaged with one end of the battery spaced from the associated end of the support providing means and for holding the other end of the battery against the other end of said support providing means and removable means for closing the open side of said support for retaining the battery therein.

6. In combination with an automobile including a side frame member and an associated fender, a battery support on said frame member beneath the fender and a cover removable from said support for permitting lateral withdrawal and insertion of the battery from said support and which cover encloses the front, the top and at least one end of the battery.

7. In combination with the chassis frame member of an automobile, a battery support comprising a pair of end members fixed to said frame member and a shelf between said end members whereby said support is open at one side, a strap member projecting from each end member of the support in the direction of the open side thereof and which strap members are connected together adjacent the frame member and means adapted to be removably attached to said strap members for closing the open side of said support.

8. In combination with the chassis frame member of an automobile, a battery support comprisng a pair of end members fixed to said frame member and a shelf between said end members whereby said support is open at one side, a strap member projecting from each end member of the support in the direction of the open side thereof and which strap members are connected together adjacent the frame member, and a cover including a side and an end together with a top removably attached to said strap members for closing the open side of said support.

9. In combination with the chassis frame member of an automobile, a battery support comprising a pair of end members fixed to said frame member and a shelf between said end members whereby said support is open at one side, a strap member projecting from each end member of the support in the directon of the open side thereof, a yieldable spacer member carried by one strap member and engaged with one end of the battery in a manner holding its other end engaged with the other end member of the support and means removably attached to said strap members for closing the open side of the support.

10. A battery mounting comprising a shelf and a pair of spaced brackets each adapted for attachment to an automobile frame member, a U-shaped strap including side legs attached to said brackets and a cross bar connecting said legs along one side of the mounting and a member removably attached to the ends of said side legs for connecting them together and for closing the open side of the mounting.

11. A battery mounting comprising a shelf and a pair of spaced brackets each adapted for attachment to an automobile frame member, a U-shaped strap including side legs attached to said brackets and a cross bar connecting said legs along one side of the mounting, a yieldable spacer device carried by one of said strap legs for engagement with one end of the battery and a member removably attached to the ends of said legs for connecting them together.

12. A battery mounting comprising a shelf and a pair of spaced brackets each adapted for attachment to an automobile frame member, a U-shaped strap including side legs attached to said brackets and a cross bar connecting said legs along one side of the mounting, a yieldable spacer device carried by one of said strap legs for engagement with one end of the battery and a cover including a side, end and a top wall with the side wall arranged for detachable engagement with the ends of said legs for closing the associated side of said mounting.

13. In a battery mounting, a shelf, means providing an upstanding bracket at each end of the shelf formed for attachment to an automobile frame member and a U-shaped strap arranged above the shelf and including end legs attached to said bracket and a cross bar connecting said end legs together, each end leg being formed for engagement by a coacting cover.

In testimony whereof, I have hereunto set my hand, this 9th day of July, 1930.

HERBERT C. SNOW.